No. 897,106. PATENTED AUG. 25, 1908.
C. F. KADE.
CONTAINING AND DISPENSING VESSEL.
APPLICATION FILED DEC. 27. 1907.
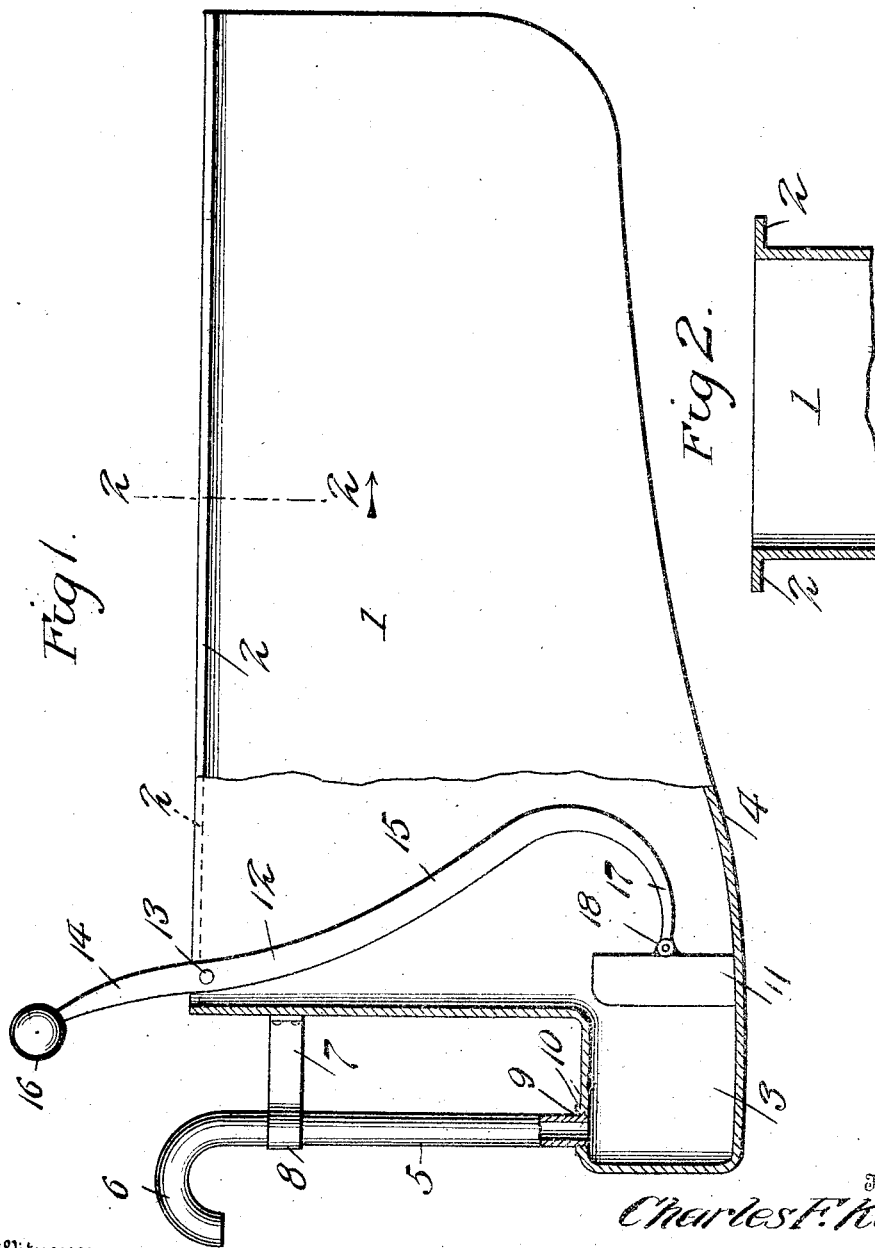
Witnesses
Hugh H. Ott
C. C. Hines
Inventor
Charles F. Kade
By Victor J. Evans
Attorney

UNITED STATES PATENT OFFICE.

CHARLES F. KADE, OF SHEBOYGAN, WISCONSIN.

CONTAINING AND DISPENSING VESSEL.

No. 897,106.   Specification of Letters Patent.   Patented Aug. 25, 1908.

Application filed December 27, 1907. Serial No. 408,242.

*To all whom it may concern:*

Be it known that I, CHARLES F. KADE, a citizen of the United States, residing at Sheboygan, in the county of Sheboygan and State of Wisconsin, have invented new and useful Improvements in Containing and Dispensing Vessels, of which the following is a specification.

This invention relates to improvements in containing and dispensing vessels of that class adapted for holding syrup or other liquids and provided with means for successively discharging portions of the liquid contained therein.

The object of the invention is to provide a simple and inexpensive construction of vessel of this character so formed and provided with removable operating parts as to permit ready disassociation of the parts for the purpose of cleansing the same and the vessel, and in which the construction is also such as to permit the entire contents of the vessel to be expelled by the operating or expelling mechanism, which is designed to effect the discharge of measured portions of the contents and to adapt the device as a whole to be easily and economically manufactured.

With this and other objects in view, the invention consists of the features of construction, combination and arrangement of parts hereinafter fully described, illustrated and claimed, reference being had to the accompanying drawing, in which:—

Figure 1 is a side elevation, partly in section, of the improved containing and dispensing vessel. Fig. 2 is a transverse section on the line 2—2 of Fig. 1.

Referring now more particularly to the drawing, the numeral 1 designates a containing and dispensing vessel which may be constructed of any suitable material and of any desired form and size, but which is preferably of oblong rectangular form, as shown. The vessel 1 is provided along the upper edges of its sides with flanges 2, adapting it to be slidably supported or suspended in a soda fountain in any suitable manner. Located at the lower front portion of the vessel is a well or plunger chamber 3, which projects beyond the front wall of the vessel and opens at its rear end in the plane of said wall into the containing chamber formed by the body of the vessel. This well is designed to be filled with liquid flowing thereto by gravity from the vessel. The lower wall 4 or bottom of the vessel slopes or inclines gradually downwardly and forwardly to said plunger chamber, thus disposing the latter at the lowest point of the vessel, thus allowing the contents of the vessel to flow into the well or plunger chamber until such contents are fully and entirely discharged.

Projecting upwardly from the plunger chamber 3 is a discharge spout 5 arranged in advance of the front wall of the vessel and having a downwardly bent upper end 6 which terminates about on a level with the upper portion of the vessel. The said discharge spout is supported and braced adjacent to its upper end by means of a bracket arm 7 fixed at one end to the wall of the vessel and formed at its outer end with an eye or bearing 8 in which the spout is free to turn for application and removal. The spout is formed with an externally threaded lower end 9 engaging a screw threaded aperture 10 in the upper portion of the plunger chamber 3. The discharge spout is thus adapted to be readily removed from engagement with the plunger chamber and the bracket 7 when it is desired to clean the same.

From the foregoing description, it will be apparent that the syrup or other liquid contents of the vessel 1 will feed by gravity to the well or plunger chamber 3, which is of sufficient size to contain a prescribed quantity to be discharged at a time. In order to effect the successive discharges of portions of the contents of the prescribed quantity, a plunger 11 is provided to accurately fit the chamber 3 and to be forced forwardly therein to expel the entire contents thereof through the discharge spout 5. A lever 12 is employed to operate the plunger, and is fulcrumed on a removable transverse pin 13 extending across and engaging openings in the side walls of the vessel at the upper forward end of the latter. The lever is compoundly curved to provide an upper short arm 14 and a lower relatively longer arm 15. The upper arm 14 carries a knob, finger piece or handle 16 by which the lever may be rocked on its fulcrum to project and retract the plunger, and extends above the vessel and is curved forwardly so as to project said handle beyond the plane of the front wall of the vessel when the plunger is in retracted position. The arm 15 of the lever has a gradual downward and rearward curvature from the fulcrum pin 13 and is provided at its lower end with a goose-neck or downwardly and forwardly curved extension 17, to which the plunger 11 is pivotally connected, as shown at 18.

In operation, the plunger and lever are normally disposed in the position shown in Fig. 1, in which the plunger 11 rests upon the bottom 4 of the vessel in rear of the mouth of the well or plunger chamber 3, so that the liquid contents of the vessel may flow into said chamber. When it is desired to expel that portion of the contents contained within the plunger chamber, the arm 14 of the lever is forced rearwardly by means of the handle 16, whereby the arm 15 of the lever will be moved in a forward direction, thus forcing the plunger 11 into and along the full length of the plunger chamber 3 to expel its contents through the spout 5. The curved form of the lever arm 15 and its extension 17 adapts the plunger 11 to have a full forward projection into the well beyond the front wall of the container body, since the extension 17 is adapted to swing into and out of the well, and the arm 15 to assume, on the propelling stroke, a substantially vertical position, by which the construction of the plunger chamber wholly in advance of the front of the vessel and its disposition at the lower front end thereof is permitted. After the lever has been operated to expel the contents of the chamber 3, it may be rocked in the reverse direction to restore the plunger to normal position, so that the plunger chamber may be again filled. By successive operations of the plunger in this manner the contents of the vessel, in prescribed quantities at a time, may be successively discharged until the entire amount of liquid contained in the vessel is exhausted. The construction and arrangement of the plunger chamber and plunger mechanism is also such that when the vessel is nearly empty and the syrup is consequently low in the discharge spout 5, a single stroke of the plunger will raise the syrup in the spout and discharge the same therefrom. As all of the syrup or liquid in the vessel will drain into the chamber 3, the entire contents of the vessel may be expelled, as will be readily understood.

By removably mounting the spout and plunger mechanism these parts may be readily and conveniently detached from the vessel, thereby allowing all of the parts of the device as a whole to be readily and conveniently cleaned, and as these elements are of a simple construction the vessel may be manufactured at a comparatively low cost.

Having thus fully described the invention, what is claimed as new is:—

1. A liquid containing and dispensing apparatus comprising an oblong rectangular vessel having a downwardly and forwardly sloping bottom wall and formed at its lower forward end with a plunger chamber or well arranged wholly in advance of the front wall of the vessel and opening at its rear end into the body thereof, a discharge spout supported at the front of the vessel and communicating at its lower end with the plunger chamber, a plunger adapted for operation in said plunger chamber, and an operating lever pivotally supported upon the body of the vessel and having a lower downwardly and forwardly curved end pivotally connected with the plunger and adapted upon the forward movement thereof to enter the plunger chamber.

2. A liquid containing and dispensing apparatus comprising an oblong rectangular vessel having a downwardly and forwardly sloping bottom and provided at the lower front end thereof with a forwardly extending well or plunger chamber, projecting wholly in advance of the front wall of the vessel and opening at its rear end into the latter, a discharge spout removably mounted at the front end of the vessel and communicating with the plunger chamber, a transverse fulcrum pin removably mounted at the upper front portion of the vessel, a plunger adapted to operate in the plunger chamber, and a lever mounted on said fulcrum pin and having an upper forwardly curved arm provided with operating means and a lower downwardly and rearwardly curved arm, said arm being provided at its lower end with a forwardly and downwardly curved extension pivotally connected with the plunger.

3. A liquid containing and dispensing device comprising an oblong rectangular vessel having a downwardly and forwardly sloping bottom wall and provided at its lower forward end with a forwardly extending, integral plunger chamber or well, a discharge spout upon the exterior of the vessel and leading from the well, a plunger adapted when retracted to move into the body and to be projected into said plunger chamber, and a lever pivotally supported at the front of the vessel and pivotally connected at its lower end to the plunger, the said lower end of the plunger being curved or offset forwardly to enter said well.

In testimony whereof I affix my signature in presence of two witnesses

CHARLES F. KADE.

Witnesses:
A. J. DE SMIAT,
A. BURKART